(12) United States Patent
Hosler et al.

(10) Patent No.: US 12,022,599 B2
(45) Date of Patent: Jun. 25, 2024

(54) POLARIZATION-MULTIPLEXED RADIATOR SYSTEM, LIGHT SOURCE SYSTEM, AND METHOD OF OPERATION

(71) Applicant: xLight Inc., Palo Alto, CA (US)

(72) Inventors: Erik Robert Hosler, Palo Alto, CA (US); William Alexander Schumaker, Palo Alto, CA (US); William Alphonse Barletta, Palo Alto, CA (US); George Randall Neil, Palo Alto, CA (US)

(73) Assignee: xLight Inc., Palo Alto, CA (US)

( * ) Notice: Subject to any disclaimer, the term of this patent is extended or adjusted under 35 U.S.C. 154(b) by 0 days.

(21) Appl. No.: 18/374,911

(22) Filed: Sep. 29, 2023

(65) Prior Publication Data

US 2024/0121876 A1  Apr. 11, 2024

Related U.S. Application Data

(60) Provisional application No. 63/413,938, filed on Oct. 6, 2022.

(51) Int. Cl.
*H05G 2/00* (2006.01)
(52) U.S. Cl.
CPC ..................... *H05G 2/00* (2013.01)
(58) Field of Classification Search
CPC ....................................... H05G 2/00
See application file for complete search history.

(56) References Cited

U.S. PATENT DOCUMENTS

| | | | |
|---|---|---|---|
| 9,392,679 B2 | 7/2016 | Hosler | |
| 9,541,839 B2 | 1/2017 | Hosler | |
| 9,823,571 B2 | 11/2017 | Patra | |
| 9,844,124 B2 | 12/2017 | Hosler et al. | |
| 2014/0239805 A1 | 8/2014 | Plettner | |
| 2014/0270086 A1* | 9/2014 | Krasnykh | H05G 2/00 378/124 |
| 2017/0003597 A1* | 1/2017 | Patra | H01S 3/0903 |
| 2017/0019982 A1* | 1/2017 | Hosler | H05G 2/00 |

OTHER PUBLICATIONS

JP-2017050347-A and its English translation (Year: 2017).*
Bahrdt, J., et al., "Magnetic field optimization of permanent magnet undulators for arbitrary polarization", Nuclear Instruments and Methods in Physics Research A 516 (2004) 575-585.
Citron, A., et al., "The Karlsruhe—Cern Superconducting RF Separator", Nuclear Instruments and Methods 164 (1979) 31-55.
(Continued)

*Primary Examiner* — Chih-Cheng Kao
(74) *Attorney, Agent, or Firm* — Jeffrey Schox; Samuel Rosenthal

(57) ABSTRACT

A polarization-multiplexed radiator system, preferably including one or more electron splitters, undulator networks, electron combiners, and/or optics, and preferably integrated into a light source system that can include one or more accelerator modules and/or radiator modules. A method of operation, preferably including receiving high-energy electrons, separating electrons, and/or generating optical outputs S330, and optionally including separating outputs, providing the optical outputs, and/or outputting electrons.

23 Claims, 9 Drawing Sheets

(56) References Cited

OTHER PUBLICATIONS

Hosoyama, K., et al., "Construction and Commisioning of Kekb Superconducting Crab Cavities", Proceedings of SRF2007, Peking Univ., Beijing, China, Sep. 2003, MO4: Progress Reports IV.
Leemann, Christoph W., et al., "The Continuous Electron Beam Accelerator Facility: Cebaf at the Jefferson Laboratory", Annu. Rev. Nucl. Part. Sci. 2001. 51:413-50.
Sasaki, Shigemi, et al., "Analyses for a planar variably-polarizing undulator", Nuclear Instruments and Methods in Physics Research A 347 (1994) 83-86 North-Holland.

* cited by examiner

POLARIZATION-MULTIPLEXED RADIATOR SYSTEM, LIGHT SOURCE SYSTEM, AND METHOD OF OPERATION

CROSS-REFERENCE TO RELATED APPLICATIONS

This application claims the benefit of U.S. Provisional Application Ser. No. 63/413,938, filed on 6 Oct. 2022, which is incorporated in its entirety by this reference.

TECHNICAL FIELD

This invention relates generally to the light source field, and more specifically to a new and useful polarization-multiplexed radiator system, light source system, and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
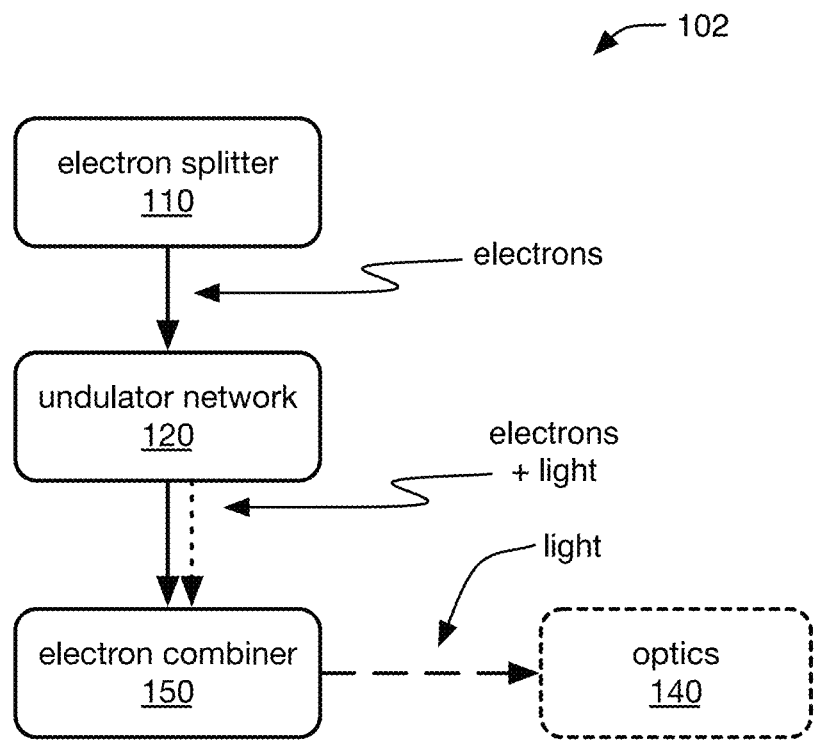
FIG. 1A is a schematic representation of an embodiment of a polarization-multiplexed radiator system.
Figure 1B:
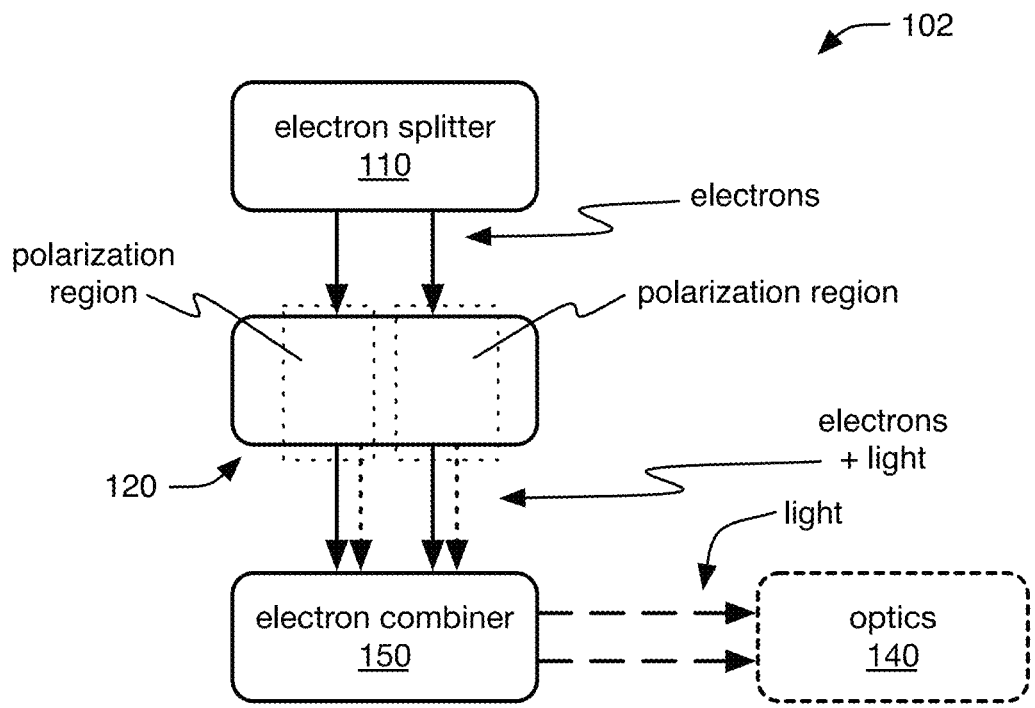
FIG. 1B is a schematic representation of an example of the polarization-multiplexed radiator system.

A polarization-multiplexed radiator system 102 preferably includes one or more: electron splitters 110, undulator networks 120, electron combiners 150, and/or optics 140 (e.g., as shown in FIGS. 1A-1B). However, the radiator system 102 can additionally or alternatively include any other suitable elements in any suitable arrangement.

Figure 2A:
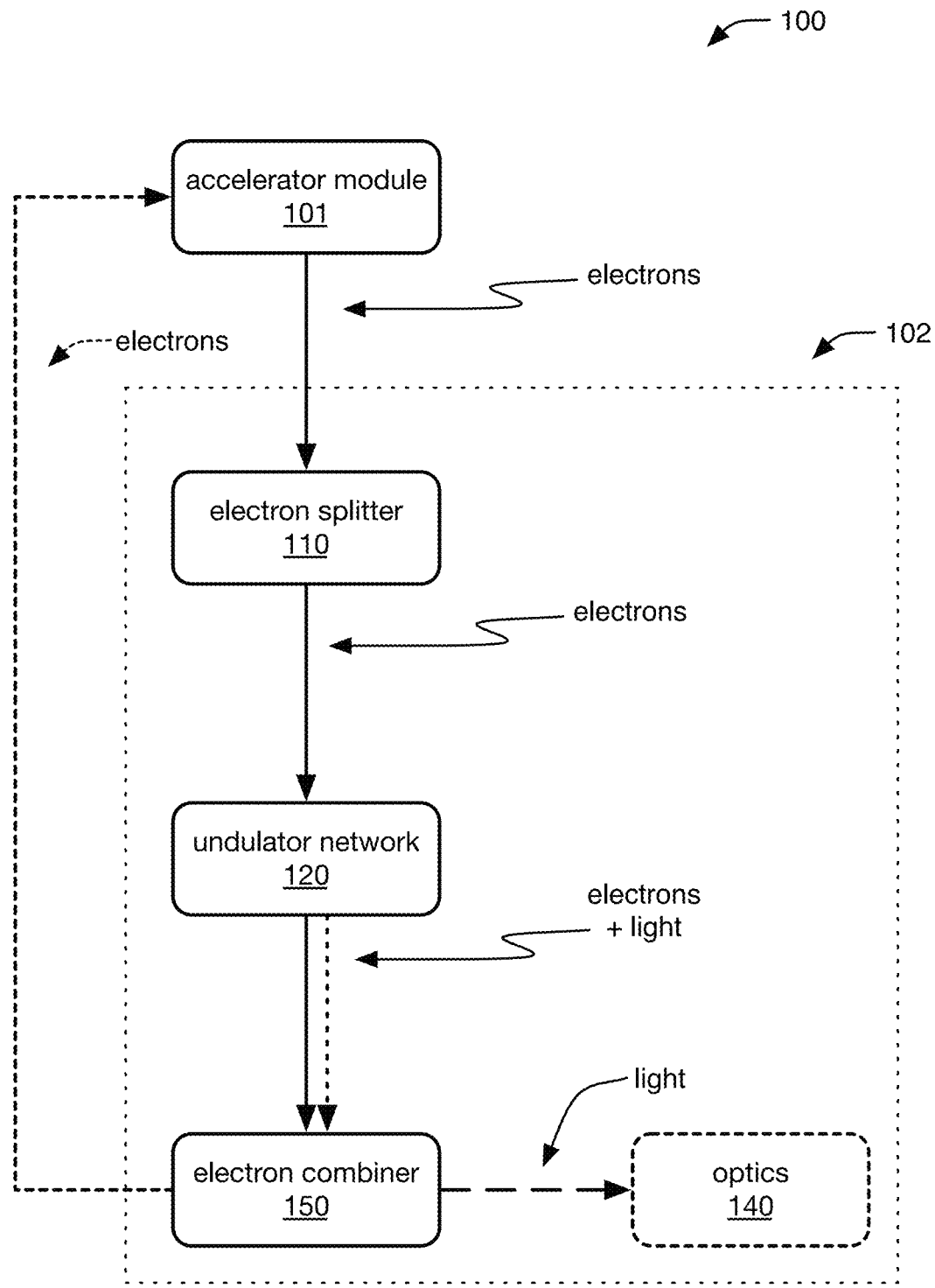
FIG. 2A is a schematic representation of an embodiment of a light source system.
Figure 2B:
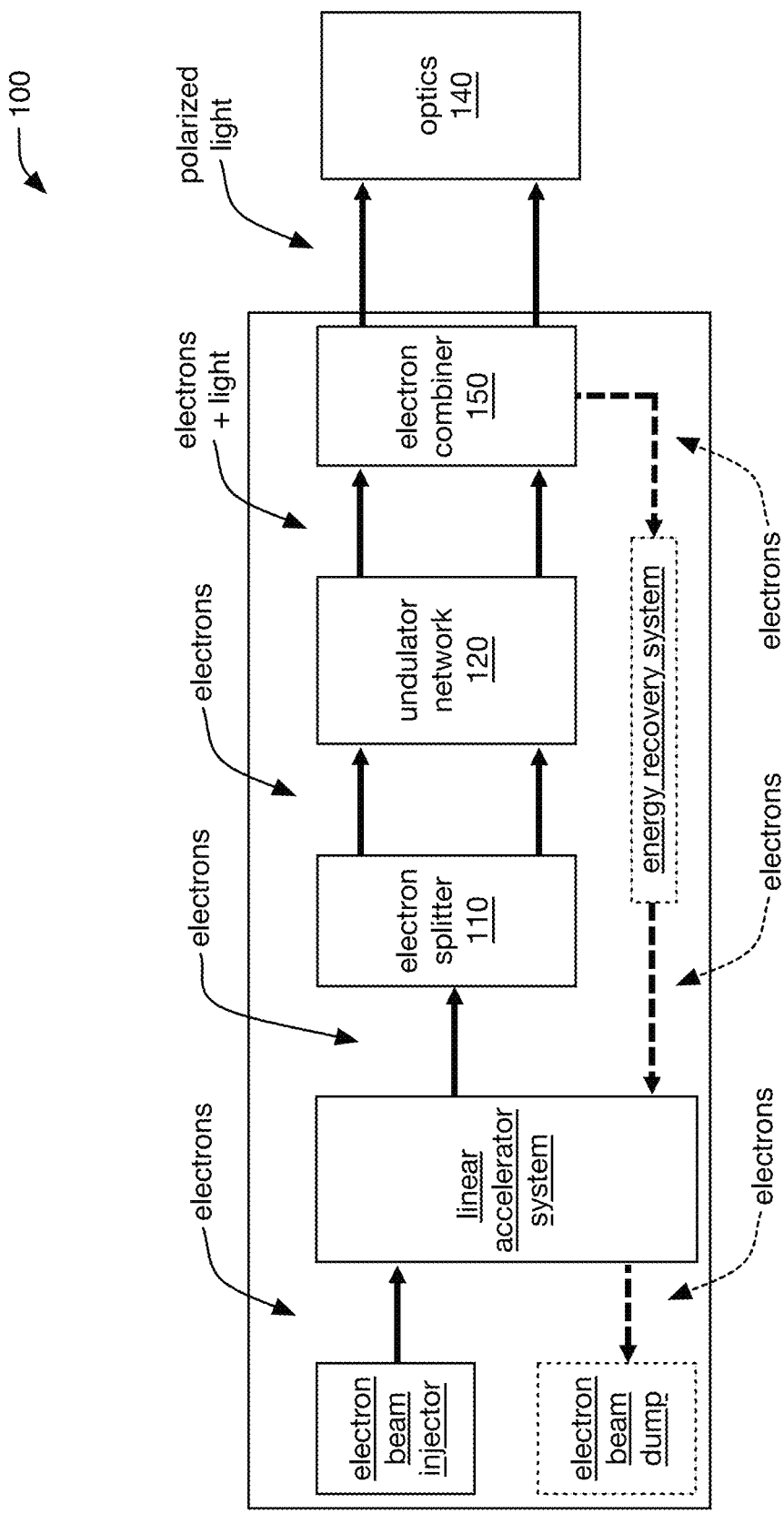
FIGS. 2B-2C are schematic representations of a first and second example, respectively, of the light source system.
Figure 2C:
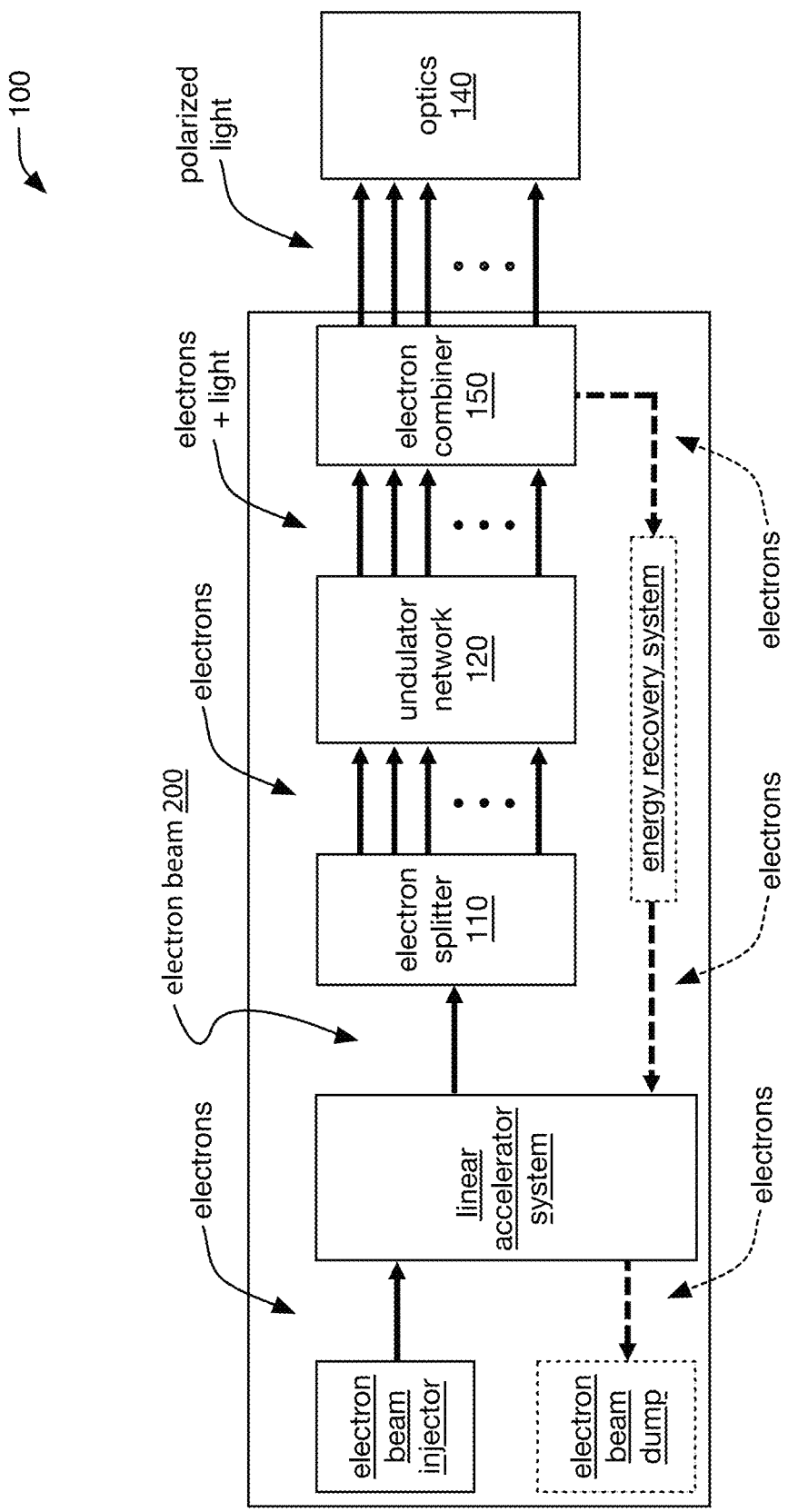

The radiator system 102 is preferably integrated into a light source system 100. The light source system 100 can include one or more accelerator modules 101 and/or radiator modules 102 (e.g., as shown in FIGS. 2A-2C). However, the light source system 100 can additionally or alternatively include any other suitable elements in any suitable arrangement.

The light source system 100 and/or polarization-multiplexed radiator system 102 preferably function to provide one or more polarization-multiplexed light outputs. The light output preferably has high photon energy, such as being EUV light (e.g., 13.5 nm, 6.7 nm, etc.), X-ray light, and/or any other suitable high-energy light, but can additionally or alternatively have any other suitable photon energy. The light output is preferably substantially monochromatic (e.g., having a bandwidth less than 1, 0.5, 0.3, 0.2, 0.1 nm, or less, less than 10%, 5%, 2%, 1%, or less of the nominal or central wavelength, etc.), but can alternatively have any other suitable bandwidth. The light output is preferably polarized or substantially polarized (e.g., to facilitate use with semiconductor fab photolithography equipment, such as steppers and/or scanners), more preferably wherein the system(s) are operable to control the polarization of the light (e.g., to control the polarization direction of linearly-polarized light, to control the intensity ratio between two different polarized outputs such as linearly-polarized outputs having substantially perpendicular polarization relative to each other, etc.), but can alternatively be unpolarized, partially polarized, or have any other suitable polarization; in some embodiments, some or all light beams can have different polarizations as compared with each other (e.g., different linear polarizations, such as s-polarized and p-polarized light or other orthogonal polarizations; different circular and/or elliptical polarizations, such as having opposing handedness; some linearly polarized and others circularly and/or elliptically polarized; etc.). The light output is preferably coherent or substantially coherent, but can alternatively be incoherent or have any other suitable coherency. However, the light output by the system 100 can additionally or alternatively have any other suitable characteristics. In some embodiments, the light source system can define a free-electron laser (FEL) or a plurality of FELs (e.g., wherein each FEL of the output is configured to output a separate beam of light).

In some embodiments, the light source system 100 and/or polarization-multiplexed radiator system 102 (and/or any elements thereof) can include one or more elements (and/or any suitable aspects thereof) such as described in U.S. patent application Ser. No. 14/803,068, filed 18 Jul. 2015 and titled "METHOD, APPARATUS AND SYSTEM FOR PROVIDING MULTIPLE EUV BEAMS FOR SEMICONDUCTOR PROCESSING", U.S. Pat. No. 9,541,839, granted 10 Jan. 2017 and titled "METHOD AND DEVICE FOR SPLITTING A HIGH-POWER LIGHT BEAM TO PROVIDE SIMULTANEOUS SUB-BEAMS TO PHOTOLITHOGRAPHY SCANNERS", U.S. Pat. No. 9,392,679, granted 12 Jul. 2016 and titled "METHOD, APPARATUS AND SYSTEM FOR USING FREE-ELECTRON LASER COMPATIBLE EUV BEAM FOR SEMICONDUCTOR WAFER PROCESSING", and/or U.S. Pat. No. 9,844,124, granted 12 Dec. 2017 and titled "METHOD, APPARATUS AND SYSTEM FOR USING FREE-ELECTRON LASER COMPATIBLE EUV BEAM FOR SEMICONDUCTOR WAFER METROLOGY", each of which is herein incorporated in its entirety by this reference.

Figure 7:
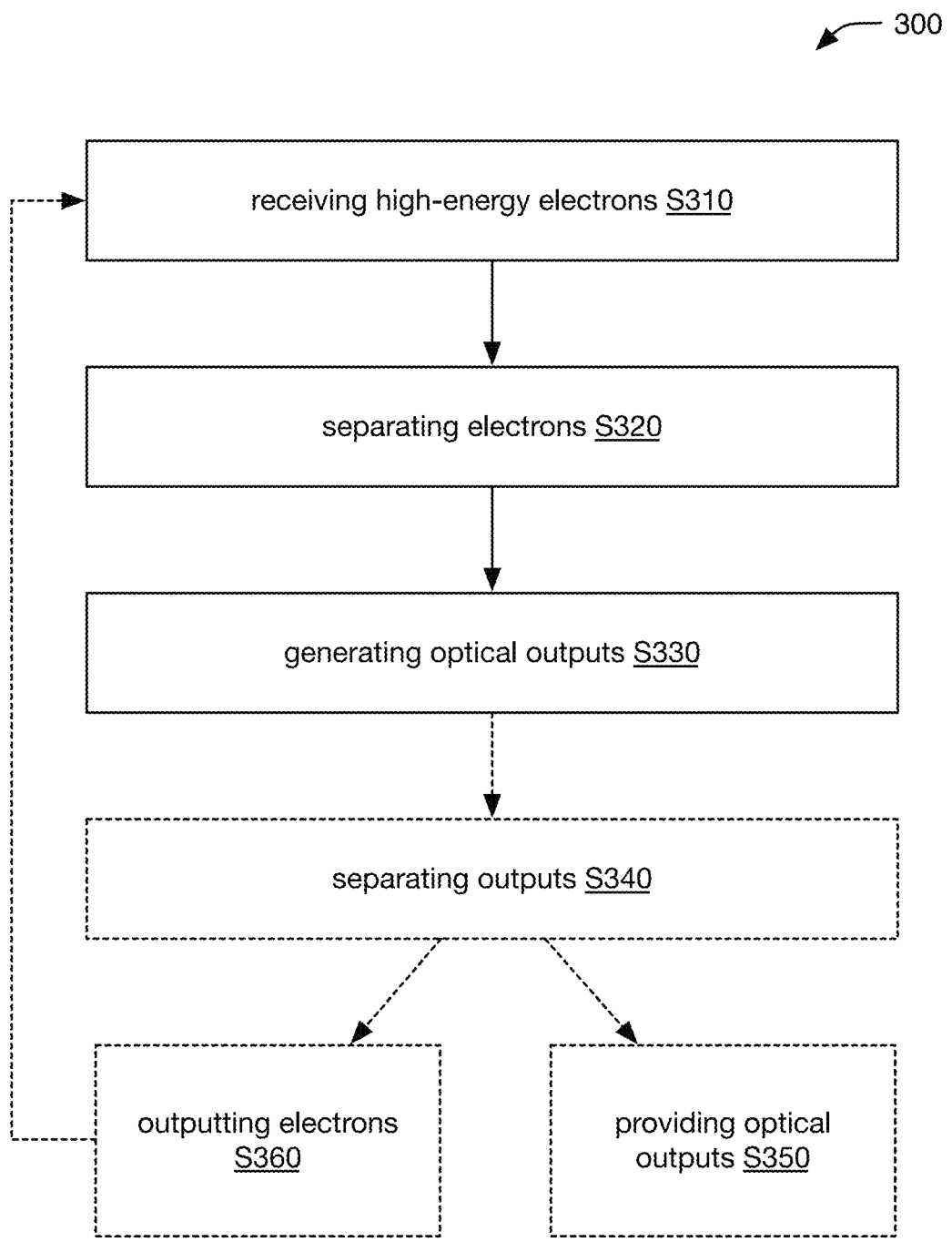
FIG. 7 is a flowchart representation of an embodiment of a method of operation.

A method of operation 300 preferably includes operating a system to generate a light output (e.g., a plurality of output beams). In some embodiments, the method 300 preferably includes receiving high-energy electrons S310, separating electrons S320, and/or generating optical outputs S330, and can optionally include separating outputs S340, providing the optical outputs S350, and/or outputting electrons S360 (e.g., as shown in FIG. 7). The method is preferably performed using the light source system 100 described herein (and/or any other suitable elements thereof), but can additionally or alternatively be performed using any other suitable system(s).

A person of skill in the art will recognize that, as used herein, the terms 'radiator system', 'radiator module', and the like can be interpreted to refer to items (e.g., systems, modules, etc.) including any suitable element(s) that emit (and/or are configured to emit) light, including any suitable undulator(s) used for free-electron lasing (e.g., undulator configured to receive high-energy electrons, generate microbunching in the electrons, and generate coherent radiation via free-electron lasing from the micro-bunched electrons; undulator configured to receive micro-bunched electrons, such as from a buncher undulator and/or any other suitable element(s), and generate coherent radiation via free-electron lasing from the micro-bunched electrons; etc.) and/or any other suitable structure(s), and is not necessarily limited to any particular kind of undulator; although the term 'radiator' may be used in certain communities to refer specifically to an undulator configured to receive micro-bunched electrons and generate coherent radiation via free-electron lasing from the micro-bunched electrons, the terms 'radiator', 'radiator system', 'radiator module', and the like, as used herein, should not be interpreted to carry any such specific limitation, but instead may refer to any of a broad variety of items including elements that emit (and/or are configured to emit) light.

2. Light Source System

The light source system preferably includes an accelerator module 101 (or multiple accelerator modules). The accelerator module 101 preferably functions to provide a beam 200 of high-energy (e.g., relativistic) electrons (e.g., providing the electron beam to its corresponding radiator module). The accelerator module 101 can additionally or alternatively function to accept one or more electron beams (e.g., from its corresponding radiator module), such as after the electron beam(s) are used for lasing.

The electron beam 200 preferably includes a plurality of electron bunches 210 (e.g., wherein the accelerator module is preferably a bunched-beam accelerator module, such as a radio-frequency (RF) accelerator module in which the accelerator drives the bunches using one or more RF fields), wherein each bunch preferably travels substantially along a beam path defined by the accelerator module (e.g., wherein the system may define a plurality of such beam paths).

The electrons of each electron beam can define an electron energy (e.g., nominal electron energy), preferably on the order of hundreds of MeV (e.g., 600, 800, 1000, 1200, 1400, 300-100, and/or 1000-1300 MeV, etc). In a first specific example, an electron energy of 800 MeV can be used for generation of 13.5 nm light. In a second specific example, an electron energy of 1200 MeV can be used for generation of 6.7 nm light. However, the electrons can additionally or alternatively have any other suitable energy characteristics.

In some embodiments, the accelerator module 101 includes an electron beam injector and a linear accelerator system, and can optionally include an energy recovery system and/or an electron beam dump. In some such embodiments, the accelerator module 101 (and/or any elements thereof, including, without limitation, the electron beam injector, linear accelerator system, energy recovery system, and/or electron beam dump) can include one or more elements (and/or any suitable aspects thereof) such as described in U.S. patent application Ser. No. 14/803,068, filed 18 Jul. 2015 and titled "METHOD, APPARATUS AND SYSTEM FOR PROVIDING MULTIPLE EUV BEAMS FOR SEMICONDUCTOR PROCESSING", U.S. Pat. No. 9,541,839, granted 10 Jan. 2017 and titled "METHOD AND DEVICE FOR SPLITTING A HIGH-POWER LIGHT BEAM TO PROVIDE SIMULTANEOUS SUB-BEAMS TO PHOTOLITHOGRAPHY SCANNERS", U.S. Pat. No. 9,392,679, granted 12 Jul. 2016 and titled "METHOD, APPARATUS AND SYSTEM FOR USING FREE-ELECTRON LASER COMPATIBLE EUV BEAM FOR SEMICONDUCTOR WAFER PROCESSING", and/or U.S. Pat. No. 9,844,124, granted 12 Dec. 2017 and titled "METHOD, APPARATUS AND SYSTEM FOR USING FREE-ELECTRON LASER COMPATIBLE EUV BEAM FOR SEMICONDUCTOR WAFER METROLOGY", each of which is herein incorporated in its entirety by this reference. For example, the accelerator module 101 can include one or more elements such as described in U.S. patent application Ser. No. 14/803,068 regarding the 'superconducting accelerator' (e.g., the accelerator module 101 can be substantially identical to the 'superconducting accelerator' of U.S. patent application Ser. No. 14/803,068).

However, the accelerator module 101 can additionally or alternatively include any other suitable elements in any suitable arrangement.

Further, the light source system 100 preferably includes one or more radiator systems (e.g., the polarization-multiplexed radiator system(s) 102 described herein). Each radiator system is preferably configured to receive one or more electron beams from an accelerator module (and can optionally be configured to output one or more electron beams to the accelerator module, such as after its use in generating light output).

However, the light source system 100 can additionally or alternatively include any other suitable elements in any suitable arrangement.

3. Polarization-Multiplexed Radiator System 3.1 Electron Splitter.

The electron splitter 110 preferably functions to separate an electron beam 200 (e.g., electron beam received from the accelerator module) onto multiple paths, and preferably to direct these paths toward the undulator network 120.

The electron splitter preferably includes one or more dynamic electromagnetic field (EMF) generators (e.g., kickers). For example, the kicker 111 can include one or more superconducting radio frequency (SRF) kickers (e.g., as described in Akemoto, M., et al. "Construction and commissioning of the compact energy-recovery linac at KEK." *Nuclear Instruments and Methods in Physics Research Section A: Accelerators, Spectrometers, Detectors and Associated Equipment* 877 (2018): 197-219, in Hosoyama, K., et al. "Construction and Commisioning of KEKB Superconducting Crab Cavities." 13*th International Workshop on RF Superconductivity*. 2007, in Leemann, C. W., et al. "The continuous electron beam accelerator facility: CEBAF at the Jefferson Laboratory." *Annual Review of Nuclear and Particle Science* 51.1 (2001): 413-450, and/or in Citron, A., et al. "The Karlsruhe-CERN superconducting rf separator." *Nuclear Instruments and Methods* 164.1 (1979): 31-55, each of which is herein incorporated in its entirety by this reference). Additionally or alternatively, the kicker 111 can include one or more non-superconducting radio frequency (RF) cavities (e.g., copper cavity). The dynamic EMF generator(s) preferably function to deflect some or all electrons of the beam in different directions, thereby defining the multiple paths. For example, the kicker can deflect a first set of electron bunches of the beam in a first direction, and deflect a second set of electron bunches of the beam (e.g., all other bunches or a subset thereof) in a second direction opposite the first direction (or alternately, can impose substantially no deflection on the second set), thereby establishing two (or more) divergent paths along which the electrons travel leaving the kicker.

The electron splitter can optionally include one or more magnets 112 (e.g., dipole magnets, such as static dipole magnets). The magnets can function to increase (and/or otherwise alter) the deflection of electrons of the different paths. Accordingly, in some examples, the electron splitter includes one or more magnets arranged downstream from the dynamic EMF generator along each of the paths (or along a subset thereof).

The electron splitter preferably includes at least one dipole magnet, and can additionally or alternatively include one or more higher-order magnets (e.g., quadrupole magnets, sextupole magnets, etc.). The higher-order magnets can function to perform corrective focusing of the electron beams. Higher-order magnets can be arranged before the splitting dipole magnet, after the splitting dipole magnet (e.g., between the splitting dipole magnet and the second dipole magnet, after the second dipole magnet, etc.), and/or can have any other suitable arrangement (e.g., along the path of one or more electron beams).

The magnets of the electron splitter can be fixed magnets (e.g., creating a substantially constant magnetic field), variable magnets (e.g., operable to alter the magnetic field that they create), and/or can be any other suitable types of magnets.

The electron splitter preferably directs the separated beams (traveling along each of the multiple paths) into different polarization regions of the undulator network (e.g., as shown in FIGS. 1B and/or 3A-3C). For example, the electron splitter can direct electron beams into each of the polarization regions of the undulator network (e.g., one or more beams directed into each polarization region, such as one beam directed into each polarization region, multiple beams directed into each polarization region, etc.).

Further, in some embodiments, the electron splitter can optionally generate multiple beam paths associated with (e.g., directed into) each polarization region, which can enable generation of multiple spatially-separated light outputs of each polarization. In one example, the electron splitter generates multiple beams associated with each polarization region by imposing different amounts of deflection at the dynamic EMF generator (e.g., wherein the different amounts of deflection are achieved via different EMF intensities, such as by altering the timing of a varying electromagnetic waveform, such that different electron bunches of the beam are exposed to different field strengths within the dynamic EMF generator).

Additionally or alternatively, the electron splitter may be configured to separate the electron beam in a static or pseudo-static manner (e.g., using a substantially static magnetic field rather than a dynamic field). However, the electron splitter 110 can additionally or alternatively include any other suitable elements in any suitable arrangement, and/or can additionally or alternatively have any other suitable functionality.

3.2 Undulator Network.

The undulator network 120 preferably functions to generate multiple light outputs (e.g., via free-electron lasing), more preferably wherein some or all of the light outputs have different polarizations from each other.

The undulator network preferably defines a plurality of polarization regions, wherein each polarization region is configured to generate light having a different polarization (e.g., linear polarization with a different polarization direction). The undulator network can include two or more polarization regions. In a first example, the undulator network includes two regions (e.g., generating linearly polarized light with polarizations rotated 90° with respect to each other), such as shown by way of examples in FIGS. 3A-3B. In a second example, the undulator network defines four polarization regions (e.g., generating linearly polarized light with polarizations rotated 450 with respect to each other), such as shown by way of example in FIG. 3C. However, the undulator network can additionally or alternatively define any other suitable number and/or types of polarization regions.

The undulator network preferably includes one or more undulators 121. The undulators preferably include one or more radiators 121', and can optionally include one or more pre-bunchers 121".

Each radiator 121' preferably functions to cause one or more electron beams passing through it to generate light (e.g., via free-electron lasing). Some or all of the radiators can optionally function to create electron microbunching (e.g., prior to substantial light generation), such as in examples that do not include a pre-buncher. A person of skill in the art will recognize that, as used herein, the term 'radiator' can be interpreted to refer to any suitable undulator used for free-electron lasing (e.g., undulator configured to receive high-energy electrons, generate microbunching in the electrons, and generate coherent radiation via free-electron lasing from the micro-bunched electrons; undulator configured to receive micro-bunched electrons, such as from a buncher undulator and/or any other suitable element(s), and generate coherent radiation via free-electron lasing from the micro-bunched electrons; etc.), and is not necessarily limited to any particular kind of undulator; although the term 'radiator' may be used in certain communities to refer specifically to an undulator configured to receive micro-bunched electrons and generate coherent radiation via free-electron lasing from the micro-bunched electrons (e.g., to the exclusion of undulators configured to receive electrons that are not substantially micro-bunched and cause those electrons to become micro-bunched, possibly also causing them to generate coherent radiation via free-electron lasing), the term 'radiator' as used herein should not be interpreted to carry any such specific limitation, but instead may refer to any suitable undulator configured to cause electrons to generate coherent radiation via free-electron lasing.

Figure 3A:
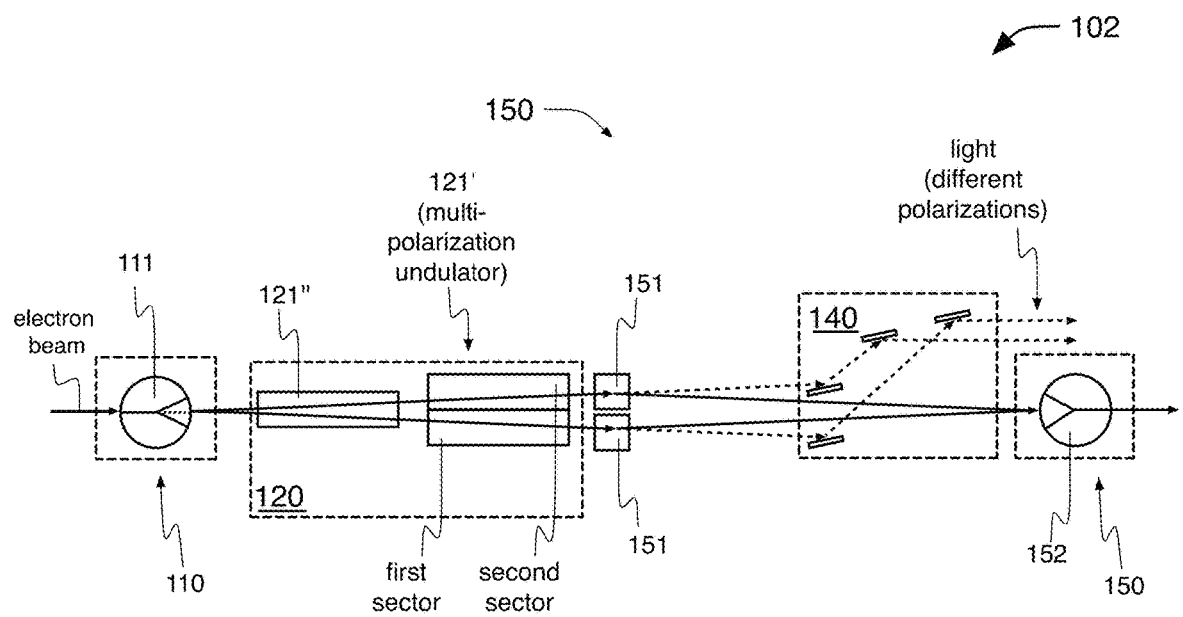
FIGS. 3A-3C are schematic representations of a first, second, and third example, respectively, of the polarization-multiplexed radiator system.
Figure 3B:
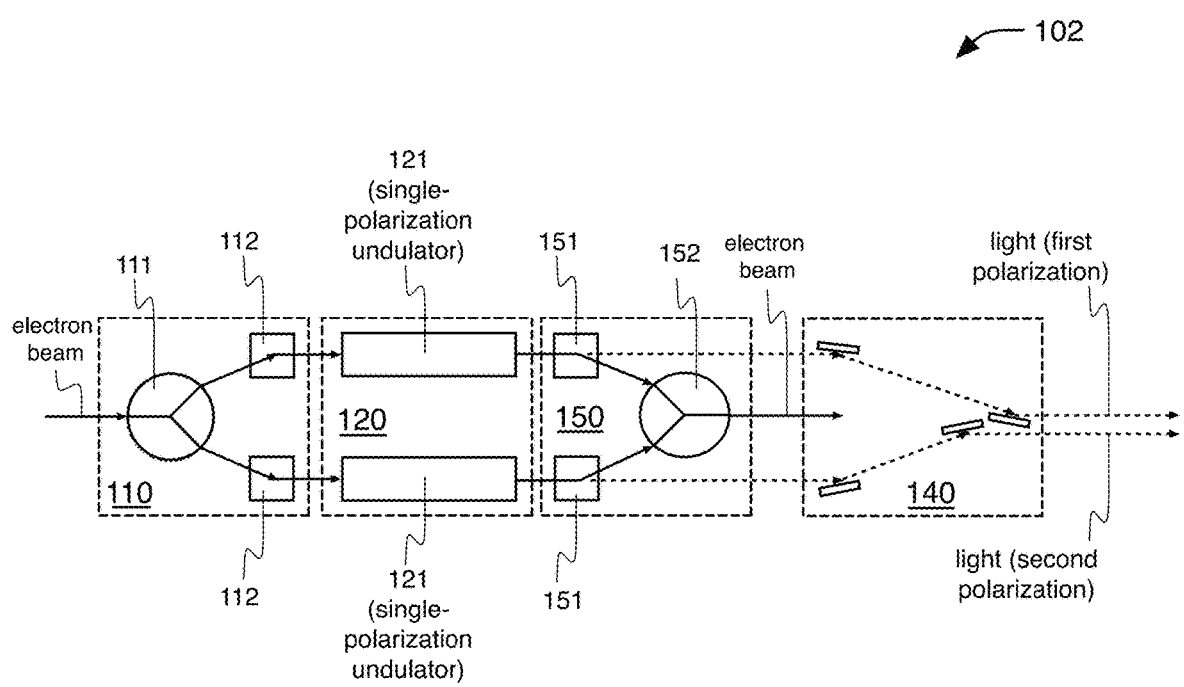
Figure 3C:
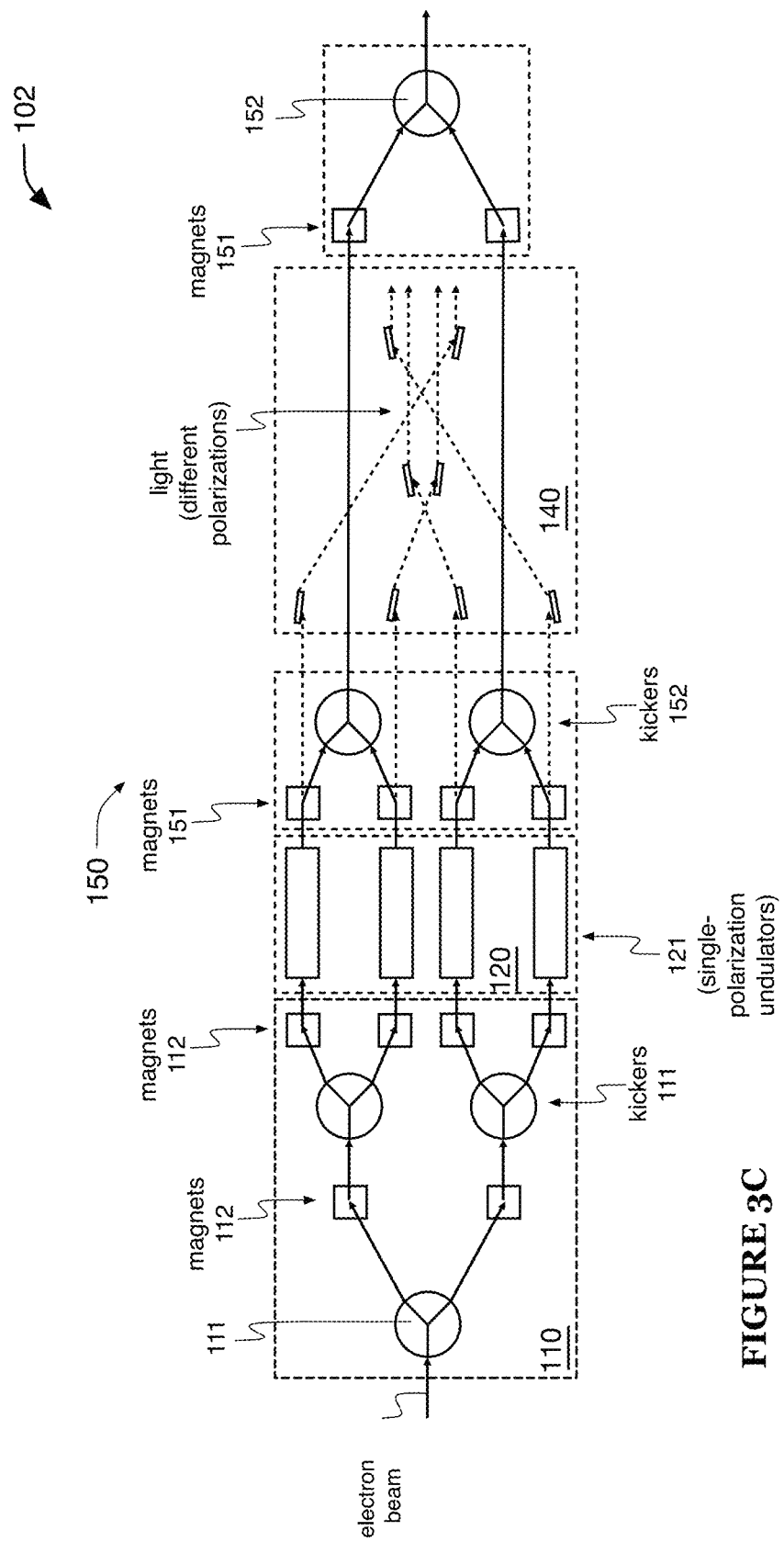
Figure 4:
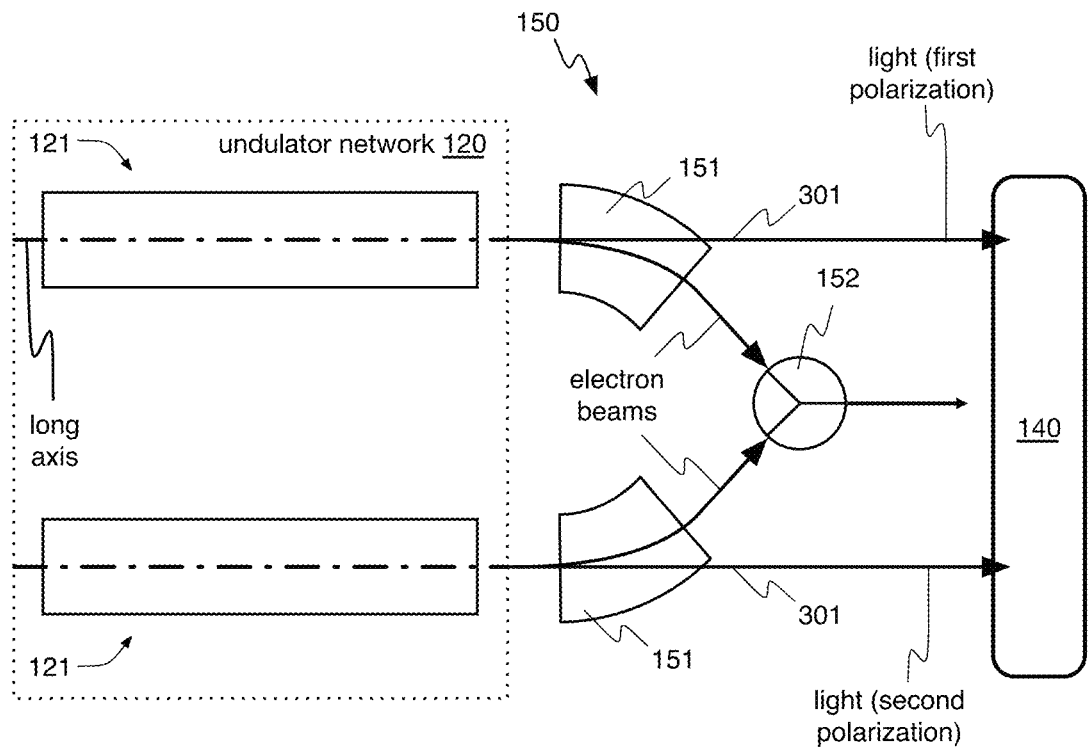
FIG. 4 is a schematic representation of an example of a portion of the polarization-multiplexed radiator system.

In a first embodiment, the radiator is a single-polarization undulator (e.g., as shown in FIGS. 3B-3C). The single-polarization undulator is preferably arranged within only a single polarization region (e.g., spanning the polarization region). Each single-polarization undulator typically exhibits a magnetic field oriented substantially across the undulator gap. Accordingly, undulators having different physical orientations (e.g., resulting in different gap directions) can be employed in different polarization regions of the network to achieve different light output polarizations. For example, a first radiator with a horizontal gap can generate horizontally-polarized light, and a second radiator with a vertical gap can generate vertically-polarized light. However, some or all of the single-polarization undulators can additionally or alternatively exhibit magnetic fields with any other suitable orientation relative to the undulator gap (e.g., substantially parallel the undulator gap such as directed along or substantially along a transverse direction defined by the undulator, which will typically generate light having a linear polarization oriented substantially across the undulator gap; directed at an oblique angle to the transverse direction and/or to a vector directed across the undulator gap, which will typically generate light having a linear polarization oriented at a different oblique angle to the transverse direction and/or to the vector directed across the undulator gap; helical undulator, which will typically generate light having a circular or elliptical polarization; etc.).

In a second embodiment, the radiator is a multi-polarization undulator. The multi-polarization undulator defines a plurality of different sectors (e.g., as shown in FIG. 3A). The sectors are preferably arranged in parallel (or substantially in parallel) along the length of the undulator (e.g., substantially parallel a long axis defined by the undulator). Each sector is preferably associated with a different polarization (e.g., exhibits a different magnetic field orientation). In one example, a first sector exhibits a magnetic field oriented across the undulator gap (e.g., along or substantially along a gap vector directed across the gap, such as a gap vector normal or substantially normal to one or more broad faces defined by the undulator that face toward and define the gap), while a second sector exhibits a magnetic field oriented along the gap (e.g., along a transverse direction substantially perpendicular to the long axis and to the gap vector). Each sector of the multi-polarization undulator is preferably arranged within (e.g., spanning) a different polarization region of the undulator network. A person of skill in the art will recognize that a multi-polarization undulator may additionally or alternatively be referred to as a set of multiple undulators (e.g., one single-polarization undulator corresponding to each sector of the multi-polarization undulator, preferably wherein each such single-polarization undulator is configured to generate light of a different polarization), such as wherein a multi-polarization undulator defining two sectors may equivalently be referred to as a set of two single-polarization undulators (e.g., undulators that abut or substantially abut, such as along an elongated side that is parallel or substantially parallel to the long axis defined by the undulator).

Figure 5:
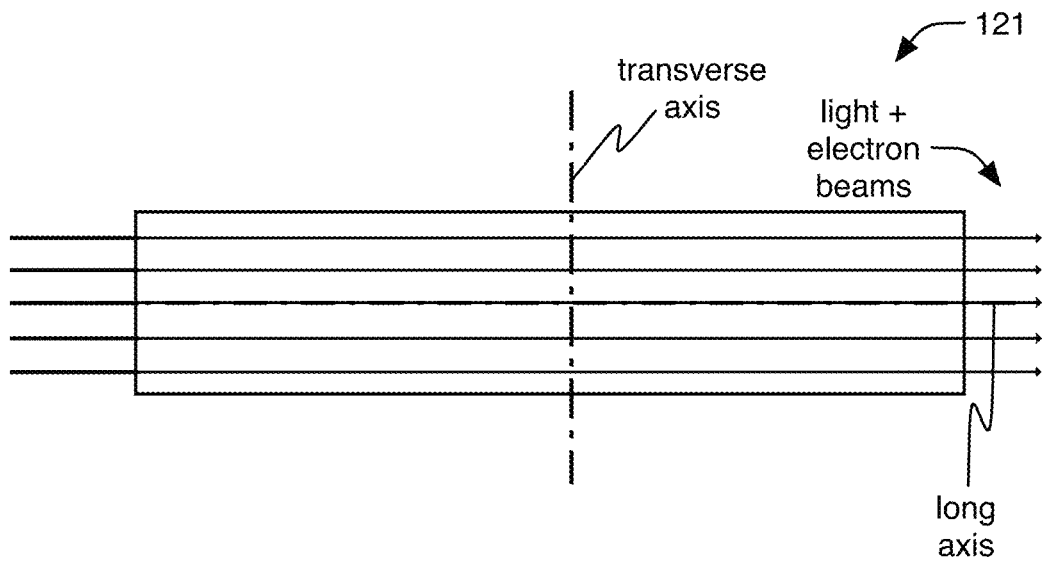
FIG. 5 is a schematic representation of an example of a single-polarization undulator of the polarization-multiplexed radiator system.

To accommodate multiple sectors and/or multiple spatially-separated electron beams (e.g., multiple beams traversing the undulator, traversing each sector of a multi-polarization undulator, etc.), some or all of the undulators may be wider (along an axis transverse to the beam propagation direction) than may be typical for a free-electron laser undulator (e.g., as shown in FIG. 5). For example, one or more of the undulators (e.g., each undulator of the set) and/or one or more of the sectors thereof can have an active field width greater than a centimeter, such as between 1-20 cm (e.g., 2, 4, 6, 8, 10, 12, 14, 16, 18, or 20 cm, within any suitable open or closed interval bounded by one or more of the aforementioned values, etc.) or greater than 20 cm, but can alternatively by less than 1 cm and/or have any other suitable width.

In some examples, some or all radiators can include a tapered region (or multiple tapered regions), preferably at or near the downstream end of the radiator. This tapered region is preferably canted outward along (or substantially along) the long axis of the radiator, such that the gap size increases along the taper (e.g., and is largest at the downstream end of the radiator). Such tapering can function to increase radiation efficiency. Additionally or alternatively, the radiators can include any other suitable elements operable to decrease magnetic field strength at or near the downstream end of the radiator (e.g., to provide analogous functionality).

However, the undulators can additionally or alternatively include any other suitable radiators 121'.

The undulators can optionally include one or more pre-bunchers 121", which can function to create electron microbunching in the electron beam or beams (e.g., prior to light generation at the one or more radiators). The pre-buncher is preferably arranged upstream of the radiators. The pre-buncher is preferably a single-polarization undulator (e.g., of arbitrary magnetic field orientation), but can alternatively be any other suitable undulator. The pre-buncher is preferably longer than the radiator, more preferably having a length on the same order of magnitude as the length of the radiator. In one example, an undulator network can include a 6 m long pre-buncher followed by a 4-5 m long radiator. However, the pre-buncher 121" can additionally or alternatively have any other suitable characteristics.

Figure 6A:
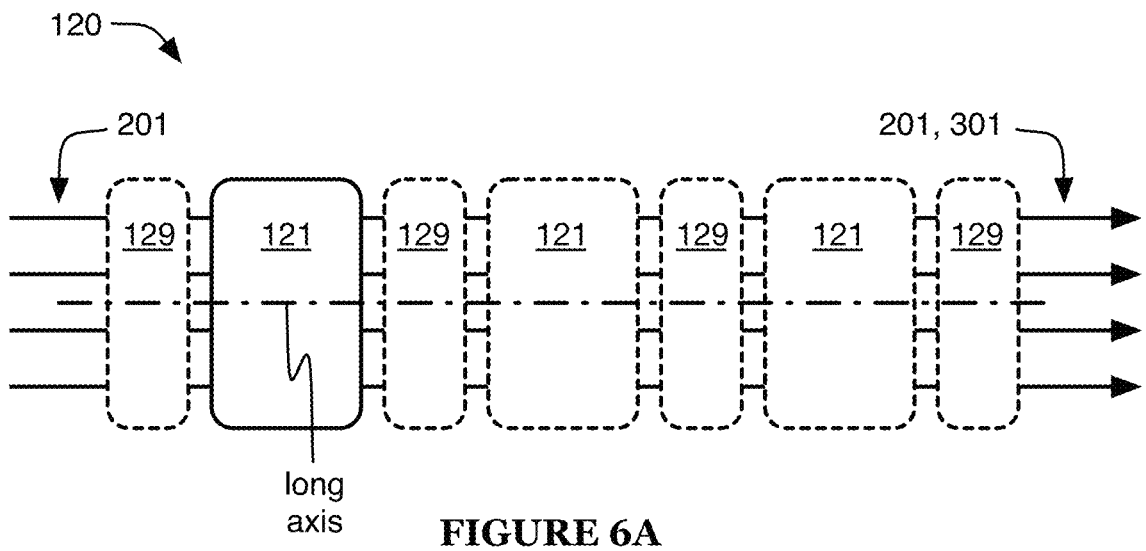
FIGS. 6A-6C are schematic representations of a first, second, and third embodiment, respectively, of a portion of an undulator network of the polarization-multiplexed radiator system.
Figure 6B:
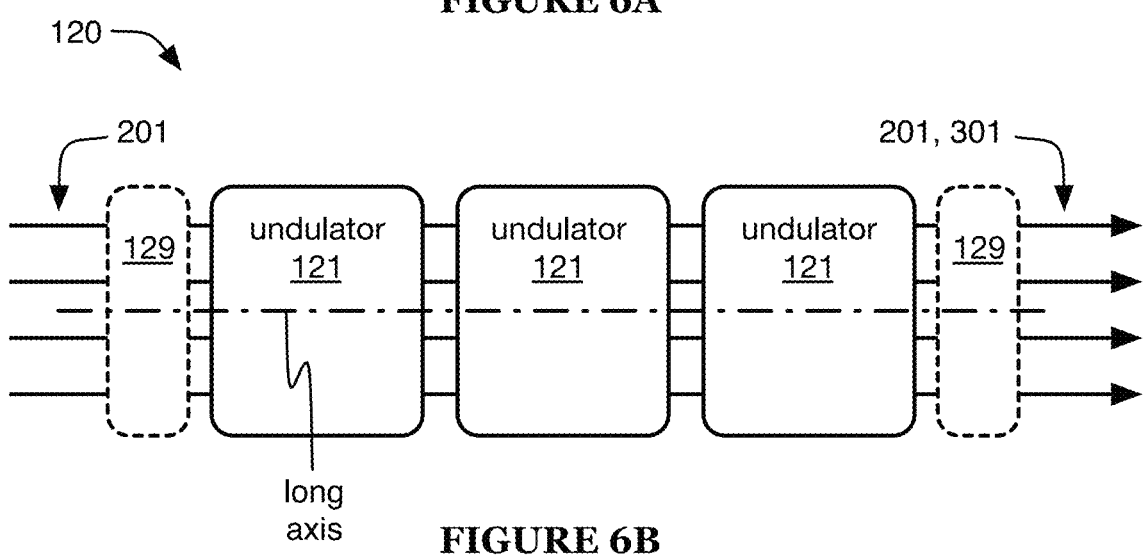
Figure 6C:
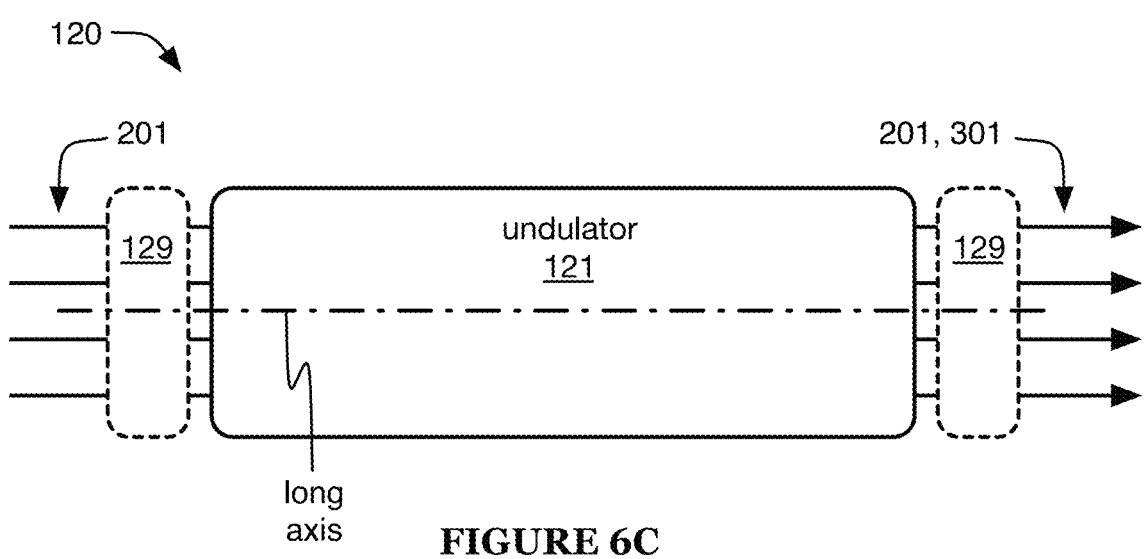

In some examples, the undulator network can include multiple undulators in place of a single undulator such as described above (e.g., the pre-buncher may include multiple undulators, one or more radiators may each include multiple undulators, etc.), such as shown by way of examples in FIGS. 6A-6C. In such examples, the multiple undulators can be arranged contiguously (or substantially contiguously) or separate from each other (e.g., with ancillary elements arranged between some of the undulators). The undulators can be substantially identical to each other or have different dimensions from one another, such as different lengths (along, or substantially along, the beam propagation direction) and/or widths (e.g., transverse, or substantially transverse, to the beam propagation direction). In one example, in which the electron beams 201 are divergent, a first undulator encountered by the beams may have a narrow width (along the transverse direction), the next undulator encountered by the beams may be wider than the first, and so on, with each subsequent undulator widening to accommodate the increased distance between the electron beams as they diverge. However, the undulators can additionally or alternatively have any other suitable shapes, dimensions, and/or arrangements.

Further, the undulator network can additionally or alternatively have any other suitable undulators in any suitable arrangement.

The undulator network can optionally include one or more ancillary elements 129. The ancillary elements are preferably arranged along the beam paths (e.g., electron beam paths and/or light beam paths). The ancillary elements can be arranged next to (e.g., between, upstream of, downstream of, etc.) the undulators and/or can have any other suitable arrangement (e.g., within the undulator network). In some examples, the ancillary elements include one or more higher-order magnets, such as quadrupole magnets, sextupole magnets, and the like. The higher-order magnets can function to perform corrective focusing of the electron beams. In some examples, these magnets can be analogous to the higher-order magnets described above with respect to the electron splitter. Additionally or alternatively, the ancillary elements can include one or more diagnostics modules, which can function to characterize system operation (e.g., characterize the state of the electron beams and/or the light generated thereby).

The magnets of the undulator region can include fixed magnets (e.g., creating a substantially constant magnetic field), variable magnets (e.g., operable to alter the magnetic field that they create), and/or can any other suitable types of magnets.

The undulator region preferably outputs the electron beams and the light beams to the electron combiner 150.

When output to the electron combiner, each electron beam is typically collinear (or substantially collinear) with the light beam generated by it (but can alternatively have any other suitable relative arrangement).

However, the undulator network 120 can additionally or alternatively include any other suitable elements in any suitable arrangement.

3.3 Electron Combiner.

The electron combiner preferably functions to recombine the electron beams (e.g., from the undulator network) onto a single path. Further, the electron combiner can additionally or alternatively function to separate the paths of the one or more electron beams from the corresponding light beams. The electron combiner 150 preferably includes one or more redirectors 151 and one or more recombiners 152 (e.g., as shown in FIGS. 3A-3C and/or 4).

Each redirector preferably functions to direct one or more electron beams toward a recombiner (e.g., while the corresponding light beams preferably continue undiverted, such as continuing toward the optics 140). The redirector preferably includes one or magnets (e.g., dipole magnets, such as static dipole magnets). The electron combiner preferably includes one redirector for each polarization region of the undulator network (or alternatively, for each electron beam propagating through the undulator network, or any suitable subset thereof). However, the electron combiner can additionally or alternatively include any other suitable number and/or types of redirectors.

The redirector preferably includes at least one dipole magnet, and can optionally include one or more additional magnets, such as higher-order magnets (e.g., quadrupole magnets, sextupole magnets, etc.). The higher-order magnets can function to perform corrective focusing of the electron beams. In some examples, these magnets can be analogous to the higher-order magnets described above with respect to the electron splitter and/or the undulator network.

The magnets of the electron combiner can include fixed magnets (e.g., creating a substantially constant magnetic field), variable magnets (e.g., operable to alter the magnetic field that they create), and/or can any other suitable types of magnets.

The recombiner preferably functions to recombine the multiple electron beams into a single beam. The recombiner preferably includes one or more dynamic EMF generators (e.g., kickers such as SRF kickers).

The electron combiner preferably outputs the light beams (e.g., from the redirectors) to the optics 140. The electron combiner can optionally output the electrons (e.g., from the recombiner, as a recombined single beam) to the accelerator module 101 (e.g., to the energy recovery system and/or electron beam dump thereof). However, the light and/or electrons can additionally or alternatively be output in any other suitable manner.

In a first embodiment, in which the undulator network includes two polarization regions, the system can include a single electron combiner (e.g., as shown in FIGS. 3A-3B). This electron combiner can include two redirectors, one arranged along each electron beam received from the undulator network, which direct the two electron beams toward a single recombiner, which then recombines the two electron beams into a single beam and provides it to the accelerator module.

In a second embodiment, in which the undulator network defines four polarization regions, the system can include three electron combiners arranged in a tree configuration (e.g., as shown in FIG. 3C). In this embodiment, each electron combiner includes two redirectors that direct two different electron beams toward a single recombiner, wherein the two 'branch' electron combiners are arranged in parallel, each receiving two of the four beams from the undulator network, and each outputting a unified electron beam toward a different redirector of the third electron combiner. The third electron combiner ('root' electron combiner) can then direct these two input beams toward its recombiner, which finally recombines the beams into a single beam.

However, the electron combiner can additionally or alternatively include any other suitable elements in any suitable arrangement.

3.4 Optics.

Each radiator module 102 can optionally include one or more sets of optics 140 (e.g., as shown in FIGS. 3A-3C). The optics can function to handle and/or manipulate the light beams 301. The optics preferably receive the light beams from the electron combiner 150. The optics can optionally function to mix two or more differently-polarized light beams (e.g., to enable control over the polarization of the resulting beam, such as via upstream control of the relative intensities of the two or more beams before mixing and/or optics-based control of the portions of the two or more beams that are mixed). The optics can direct the light beams toward downstream equipment, such as wherein the optics direct each light beam (e.g., after polarization mixing) toward a different element of downstream equipment for separate (e.g., independent) use. In one example, the optics direct the light beams toward one or more semiconductor fab tools, such as photolithography tools (e.g., steppers, scanners, etc.). However, the optics 140 can additionally or alternatively have any other suitable functionality.

4. Method of Operation 4.1 Receiving High-Energy Electrons.

Receiving high-energy electrons S310 preferably functions to provide high-energy electrons for use in the light source system. The electrons are preferably received from the accelerator system (e.g., as described above in more detail, such as described regarding the accelerator system). The electrons are preferably received at the electron splitter (e.g., at a splitter input defined by the electron splitter). The electrons can be received as a single beam ('input electron beam'), as multiple beams, and/or in any other suitable form(s). The input electron beam (and/or other electron input) preferably includes a plurality of electron bunches, more preferably wherein different electron bunches of the plurality are associated with different electron energies and/or electron energy ranges (e.g., as described above in more detail, such as described above regarding electron energy buckets). However, S310 can additionally or alternatively include receiving any other suitable electrons in any suitable manner.

4.2 Separating Electrons.

Separating electrons S320 preferably functions to separate the electron input (e.g., input electron beam) received in S310 onto a plurality of trajectories. S320 preferably separates the input electron beam into a plurality of electron beams that are spatially separated from each other (e.g., each defining a trajectory different from the others).

Herein, 'spatially separated' need not mean that there can never be any spatial co-location and/or intersection of different beams, but rather that the different beams define different trajectories such that, even if the beams do overlap and/or intersect at some point(s) along their trajectories, they will not continue to overlap and/or intersect along the entire length of their trajectories, but rather will again become non-overlapping and non-intersecting as the spatially-separated beams move away from each other following their respective beam trajectories.

S320 is preferably performed at one or more electron splitters (e.g., as described above in more detail, such as described regarding the electron splitter), such as at one or more dynamic electromagnetic field (EMF) generators thereof (e.g., kickers, such as SRF kickers and/or non-superconducting RF kickers). The electron splitter preferably redirects some or all electron bunches of the input beam, resulting in the separation of the input beam into a plurality of electron beams.

In some embodiments, S320 can additionally or alternatively include redirecting the spatially-separated electron beams (e.g., at one or more dipole magnets and/or other magnetic elements, such as described above in more detail). Redirecting the electron beams preferably includes providing the electron beams for performance of S330 (e.g., directing the electron beams toward the undulator region). Redirecting the electron beams can additionally or alternatively include altering the relationships between the trajectories of the different electron beams. For example, after being separated into the plurality of electron beams, the respective trajectories of those beams will typically be divergent; redirecting the electron beams can include making the trajectories substantially parallel (e.g., collimating the trajectories), altering the trajectories in any other suitable manner (e.g., increasing their divergence, decreasing their divergence, making them convergent, making them skew, translating some or all of them, etc.), and/or any suitable combination thereof (e.g., collimating a first subset of the trajectories, making a second subset convergent with each other and/or with the collimated first subset, and/or making a third subset divergent with each other and/or with the collimated first subset; collimating two or more separate subsets of the trajectories, such that the two or more subsets are not substantially parallel to each other, wherein they may be convergent with each other, divergent from each other, and/or have any other suitable relationship; etc.).

However, S320 can additionally or alternatively include separating electrons in any other suitable manner.

4.3 Generating Optical Outputs.

Generating optical outputs S330 preferably functions to generate a plurality of light beams (e.g., including light beams of different polarizations, preferably spatially-separated light beams directed along different trajectories). The light beams preferably have short wavelengths (e.g., EUV light), more preferably wherein each light beam has a substantially equal wavelength, such as described above in more detail. However, the light beams can additionally or alternatively have any other suitable wavelengths. The light beams are preferably generated at a set of one or more undulators (e.g., as described above in more detail regarding the undulator region). Each light beam is preferably generated via free-electron lasing from one or more of the electron beams (e.g., generated as the electron beam traverses the undulator(s)). For example, S330 can include (e.g., at the set of one or more undulators, at the undulator region, etc.) receiving the plurality of electron beams (or any suitable subset thereof) such that the electron beams traverse one or more of the undulators (optionally, redirecting one or more electron beams to do so), thereby generating the light beams via free-electron lasing from the electron beam(s).

In a first embodiment, each electron beam traverses a single multi-polarization undulator (or traverses each of a plurality of undulators), thereby generating each light output at the undulator(s). In a second embodiment, some or all electron beams traverse different undulators (e.g., single-polarization undulators) from each other (e.g., wherein a first set of one or more electron beams traverse a first undulator, thereby generating light of a first polarization, and a second set of one or more electron beams traverse a second undulator, thereby generating light of a second polarization).

However, S330 can additionally or alternatively include generating the optical outputs in any other suitable manner.

4.4 Separating Outputs.

The method can optionally include separating outputs S340, which can function to separate the light beams from the electron beams. Separating the light beams from the electron beams is preferably performed at one or more redirectors (e.g., as described above in more detail, such as regarding the electron combiner and/or the redirectors thereof), such as at a magnet element thereof (e.g., separating dipole magnet). The beam separator preferably receives the electron beams and light beams (e.g., at a dipole magnet) and redirects the electron beams (e.g., without affecting the light beams), thereby separating each electron beam from the light beam that it generated in S330 (wherein the light beam will typically share a trajectory with the corresponding electron beam until this separation occurs). After separation, the beam separator preferably outputs the light beams at a light output. However, S340 can additionally or alternatively include separating the outputs in any other suitable manner.

4.5 Providing Optical Outputs.

The method can optionally include providing optical outputs S350, which can function to provide one or more of the light beams (e.g., generated in S330) to one or more endpoints (e.g., endpoints within a semiconductor fabrication plant, such as scanners and/or other photolithography tools). S350 is preferably performed after S340 (e.g., wherein the light beams are output after the electron beams are spatially separated from them). The light beams are preferably received from the beam separator (e.g., at the light output thereof). In some examples, the light beams emerge from the light output along trajectories directed toward the desired endpoints. In other examples, S350 can include redirecting some or all of the light beams (e.g., using optics, such as grazing-incidence mirrors) onto trajectories toward the desired endpoints (and/or toward any other suitable locations). Additionally or alternatively, S350 can include combining some or all of the light beams (e.g., combining light beams having different polarizations, thereby controlling the polarization and/or spatial profile of the optical outputs). However, S350 can additionally or alternatively include providing optical outputs in any other suitable manner.

4.6 Outputting Electrons.

The method can optionally include outputting electrons S360, which can function to provide the electrons to the accelerator system and/or to any other suitable system configured to accept the electrons after their use in the light source system (e.g., as described above in more detail, such as regarding the accelerator system and/or the beam separator).

S360 preferably includes recombining the electron beams into a single recombined beam (e.g., as described above in more detail regarding the electron combiner and/or the recombiners thereof). For example, recombining the electron beams can include (e.g., after S34o) receiving the electron beams from the redirectors (e.g., wherein the redirectors have directed the electron beams onto converging trajectories), such as receiving the electron beams at a dynamic EMF generator (e.g., kicker, such as an SRF kicker or non-superconducting RF kicker) configured to recombine the beams.

S360 preferably includes (e.g., after recombining the electron beams) providing the electrons to the accelerator system (e.g., to an energy recovery system thereof) and/or to any other suitable system. In some examples, the electrons can then be used by the accelerator system (e.g., to be cycled through the accelerator again and provided to the light source system in a repetition of S110).

However, S360 can additionally or alternatively include outputting electrons in any other suitable manner, and/or the method 300 can additionally or alternatively include any other suitable elements performed in any suitable manner. Further, the method 300 can optionally include repeating any or all method elements described above (e.g., continuously, periodically, sporadically, and/or with any other suitable timing). For example, the method 300 can include continuously or substantially performing all of the method elements described above (and/or any suitable subset thereof), which can enable continuous or substantially continuous light output.

5. Illustrative Embodiments

In a first embodiment, the radiators of an undulator network are single-polarization undulators. In this embodiment, the polarization multiplexed radiator system includes an electron splitter 110 having a dynamic EMF generator configured to split the electron beam onto two (or more) divergent paths and, optionally, including electron optics (e.g. one or more static dipole magnets) along each path configured to redirect the electron beams (e.g., to achieve further separation between beams, to direct the beams along substantially parallel paths, etc.). The electron splitter preferably directs each path into a different polarization region of the undulator network (e.g., into a different single-polarization undulator thereof). In this embodiment, the undulator network 120 preferably includes a separate undulator (or series of undulators, such as a pre-buncher, followed by a radiator) corresponding to each polarization region. Each of the undulators (or series of undulators) preferably has a different gap orientation (e.g., one undulator with a horizontal gap and another undulator with a vertical gap), thereby resulting in generation of light with differently oriented linear polarization. In this embodiment, the electron combiner 150 preferably includes a redirector (e.g., static dipole magnet) arranged along each path (after the path exits the undulator network), which preferably functions to direct the electrons toward the recombiner, and includes a recombiner (e.g., kicker such as SRF kicker) that functions to combine these electrons into a single beam (which is preferably output to the accelerator system). An example of this embodiment is depicted in FIG. 3B.

In a second embodiment, the radiators of the undulator network include one or more multi-polarization undulators. In this embodiment, the polarization multiplexed radiator system preferably includes an electron splitter 11o, including a dynamic EMF generator configured to split an electron beam onto two or more divergent paths, wherein these paths are preferably directed toward each of the two (or more) sectors of a single multi-polarization undulator (e.g., following, or substantially following, the beam divergence established by the dynamic EMF generator of the electron splitter). In this embodiment, the undulator network 120 preferably includes a pre-buncher (e.g., a single-polarization undulator) upstream of a radiator. The radiator preferably includes a single multi-polarization undulator with two (or more) sectors, wherein each sector corresponds to a different polarization region of the undulator network. For example, the multi-polarization undulator can include a first sector with a magnetic field oriented across the gap (e.g., along or substantially along the gap vector), and a second sector with a magnetic field oriented parallel to the gap (e.g., substantially directed along a transverse direction perpendicular to a long axis defined by the undulator and perpendicular to the gap vector). In this embodiment, the electron combiner 150 is preferably substantially the same as described above regarding the first embodiment. An example of this embodiment is depicted in FIG. 3A.

However, the polarization multiplexed radiator system 102 and/or the light source system 100 can additionally or alternatively include any other suitable elements in any suitable arrangement.

6. Specific Examples

A numbered list of specific examples of the technology described herein are provided below. A person of skill in the art will recognize that the scope of the technology is not limited to and/or by these specific examples.

1. A method of operation for a light source system, comprising:
  at an electron splitter:
    receiving an input electron beam; and
    separating the input electron beam, comprising redirecting electrons of the input electron beam such that a first portion of the input electron beam is output at a first splitter output and a second portion of the input electron beam is output at a second splitter output; and
  after separating the input electron beam, at an undulator region comprising a set of one or more undulators:
    accepting the first portion such that it traverses a first polarization region of the undulator region, thereby generating a first light beam via free-electron lasing, the first light beam having a first optical polarization; and/or
    accepting the second portion such that it traverses a second polarization region of the undulator region, thereby generating a second light beam via free-electron lasing, the second light beam having a second optical polarization different from the first optical polarization, wherein the first light beam is spatially separated from the second light beam.

2. The method of Specific Example 1, wherein:
  upon generation, the first light beam is substantially collinear with the first portion;
  upon generation, the second light beam is substantially collinear with the second portion; and
  the method further comprises:
    after generating the first light beam, redirecting the first portion such that it is substantially non-collinear with the first light beam; and/or
    after generating the second light beam, redirecting the second portion such that it is substantially non-collinear with the second light beam.

3. The method of Specific Example 2, wherein:
  redirecting the first portion is performed at a first redirector comprising a first dipole magnet, wherein the first redirector redirects the first portion toward a recombiner;
  redirecting the second portion is performed at a second redirector comprising a second dipole magnet, wherein the second redirector redirects the second portion toward the recombiner; and the method further comprises, at the recombiner:
receiving the first portion and the second portion, wherein the first portion and the second portion are substantially non-collinear; and
redirecting at least one of the first portion or the second portion such that the first portion and the second portion are substantially collinear, thereby generating a recombined electron beam.

4. The method of Specific Example 3, wherein:
separating the input electron beam is performed at an electron splitter comprising a first dynamic electromagnetic field (EMF) generator; and/or
redirecting at least one of the first portion or the second portion is performed at a recombiner comprising a second dynamic EMF generator.

5. The method of Specific Example 3 or 4, further comprising providing the recombined electron beam to an energy recovery system.

6. The method of any of Specific Examples 1-3 or 5, wherein separating the input electron beam is performed at an electron splitter comprising a dynamic electromagnetic field (EMF) generator.

7. The method of Specific Example 6, wherein:
the input electron beam comprises a plurality of electron bunches defining a bunch frequency, wherein the electron bunches of the plurality are substantially regularly spaced;
separating the input electron beam at the electron splitter comprises driving the dynamic EMF generator at a kicker frequency; and
the method further comprises at least one of:
selecting the kicker frequency based on the bunch frequency; or
selecting the bunch frequency based on the kicker frequency.

8. The method of any of the previous Specific Examples, wherein the first light beam defines a first photon energy and the second light beam defines a second photon energy substantially equal to the first photon energy; the method further comprising, after generating the first and second light beams, mixing light of the first light beam with light of the second light beam to generate a mixed light beam.

9. The method of Specific Example 8, wherein the mixed light beam has a mixed optical polarization different from the first optical polarization and different from the second optical polarization.

10. The method of any of the previous Specific Examples, wherein:
the set of one or more undulators comprises a first undulator and a second undulator;
the first portion traverses the first undulator, wherein the first light beam is generated substantially within the first undulator; and
the second portion traverses the second undulator, wherein the second light beam is generated substantially within the second undulator.

11. The method of Specific Example 10, wherein:
the first undulator defines a first undulator gap having a first gap orientation;
the second undulator defines a second undulator gap having a second gap orientation substantially orthogonal to the first gap orientation;
the first and second light beams are substantially linearly polarized; and the first optical polarization is substantially orthogonal to the second optical polarization.

12. The method of any of the previous Specific Examples, wherein the first and second light beams are generated substantially concurrently.

13. The method of any of the previous Specific Examples, wherein:
the first portion does not traverse the first polarization region; and
the second portion does not traverse the second polarization region.

14. A light source system comprising:
an electron splitter defining a first splitter output and a second splitter output, the electron splitter comprising a dynamic electromagnetic field (EMF) generator configured to accept an input electron beam and redirect electrons of the input electron beam such that a first portion of the input electron beam is output at the first splitter output and a second portion of the input electron beam is output at the second splitter output;
a first undulator defining a first magnetic field pattern directed along a first direction, wherein the first undulator is configured to accept the first portion of the input electron beam such that the first portion traverses the first undulator, thereby generating a first light beam via free-electron lasing, the first light beam having a first optical polarization; and
a second undulator defining a second magnetic field pattern directed along a second direction substantially different than the first direction, wherein the second undulator is configured to accept the second portion of the input electron beam such that the second portion traverses the second undulator, thereby generating a second light beam via free-electron lasing, the second light beam having a second optical polarization substantially different from the first light beam.

15. The system of Specific Example 14, further comprising:
a first redirector comprising a first dipole magnet configured to accept the first portion of the input electron beam downstream of the first undulator and to redirect the first portion of the input electron beam; and/or
a second redirector comprising a second dipole magnet configured to accept the second portion of the input electron beam downstream of the second undulator and to redirect the second portion of the input electron beam.

16. The system of Specific Example 15, wherein:
the first redirector is configured to accept the first portion from the first undulator; and/or
the second redirector is configured to accept the second portion from the second undulator.

17. The system of Specific Example 15 or 16, further comprising a second dynamic EMF generator configured to:
receive the first portion downstream of the first redirector;
receive the second portion downstream of the second redirector, wherein the first portion and the second portion are substantially non-collinear; and/or
redirect at least one of the first portion or the second portion such that the first portion and the second portion are substantially collinear, thereby generating a recombined electron beam.

18. The system of any of Specific Examples 14-17, wherein:
the first direction is substantially orthogonal to the second direction;
the first and second light beams are linearly polarized; and the first optical polarization is substantially orthogonal to the second optical polarization.

19. The system of any of Specific Examples 14-18, wherein the first and second undulator cooperatively define a multi-polarization undulator comprising the first and second undulator.

20. The system of Specific Example 19, further comprising a bunching undulator arranged between the electron splitter and the multi-polarization undulator, wherein the bunching undulator is configured to:
receive the first and second portions of the input electron beam;
generate microbunching in the first and second portions;
provide the first portion to the first undulator of the multi-polarization undulator; and
provide the second portion to the second undulator of the multi-polarization undulator.

21. The system of any of Specific Examples 14-20, further comprising one or more accelerator modules configured to provide the input electron beam to the electron splitter, receive one or more output electron beams (e.g., accept a recombined electron beam, such as from a dynamic EMF generator and/or other recombiner), and/or perform energy recovery on the one or more output electron beams.

22. The system of any of Specific Examples 14-21, configured to perform the method of any of Specific Examples 1-13.

23. A system configured to perform the method of any of Specific Examples 1-13.

24. The system of Specific Example 23, further comprising one or more elements such as described regarding any of Specific Examples 14-21.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method of operation for a light source system, comprising:
at an electron splitter:
receiving an input electron beam; and
separating the input electron beam, comprising redirecting electrons of the input electron beam such that a first portion of the input electron beam is output at a first splitter output and a second portion of the input electron beam is output at a second splitter output; and
after separating the input electron beam, at an undulator region comprising a multi-polarization undulator defining a single undulator gap that spans a first and second polarization region of the multi-polarization undulator:
accepting the first portion such that the first portion traverses the undulator gap within the first polarization region, thereby generating a first light beam via free-electron lasing, the first light beam having a first optical polarization, the first light beam comprising at least one of EUV light or X-ray light; and
accepting the second portion such that the second portion traverses the undulator gap within the second polarization region, thereby generating a second light beam via free-electron lasing, the second light beam having a second optical polarization different from the first optical polarization, the second light beam comprising at least one of EUV light or X-ray light, wherein the first light beam is spatially separated from the second light beam.

2. The method of claim 1, wherein:
upon generation, the first light beam is substantially collinear with the first portion;
upon generation, the second light beam is substantially collinear with the second portion; and
the method further comprises:
after generating the first light beam, redirecting the first portion such that it is substantially non-collinear with the first light beam; and
after generating the second light beam, redirecting the second portion such that it is substantially non-collinear with the second light beam.

3. The method of claim 2, wherein:
redirecting the first portion is performed at a first redirector comprising a first dipole magnet, wherein the first redirector redirects the first portion toward a recombiner;
redirecting the second portion is performed at a second redirector comprising a second dipole magnet, wherein the second redirector redirects the second portion toward the recombiner; and
the method further comprises, at the recombiner:
receiving the first portion and the second portion, wherein the first portion and the second portion are substantially non-collinear; and
redirecting at least one of the first portion or the second portion such that the first portion and the second portion are substantially collinear, thereby generating a recombined electron beam.

4. The method of claim 3, wherein:
separating the input electron beam is performed at an electron splitter comprising a first dynamic electromagnetic field (EMF) generator; and
redirecting at least one of the first portion or the second portion is performed at a recombiner comprising a second dynamic EMF generator.

5. The method of claim 3, further comprising providing the recombined electron beam to an energy recovery system.

6. The method of claim 1, wherein separating the input electron beam is performed at an electron splitter comprising a dynamic electromagnetic field (EMF) generator.

7. The method of claim 6, wherein:
the input electron beam comprises a plurality of electron bunches defining a bunch frequency, wherein the electron bunches of the plurality are substantially regularly spaced;
separating the input electron beam at the electron splitter comprises driving the dynamic EMF generator at a kicker frequency; and
the method further comprises at least one of:
selecting the kicker frequency based on the bunch frequency; or
selecting the bunch frequency based on the kicker frequency.

8. The method of claim 1, wherein the first light beam defines a first photon energy and the second light beam defines a second photon energy substantially equal to the first photon energy; the method further comprising, after generating the first and second light beams, mixing light of the first light beam with light of the second light beam to generate a mixed light beam.

9. The method of claim 8, wherein the mixed light beam has a mixed optical polarization different from the first optical polarization and different from the second optical polarization.

10. The method of claim 1, wherein the first and second light beams are generated substantially concurrently.

11. The method of claim 1, wherein:
the first portion does not traverse the first polarization region; and
the second portion does not traverse the second polarization region.

12. The method of claim 1, wherein:
the first polarization region exhibits a first magnetic field orientation within the undulator gap; and
the second polarization region exhibits a second magnetic field orientation within the undulator gap, the first magnetic field orientation substantially different from the second magnetic field orientation.

13. The method of claim 12, wherein the first magnetic field orientation is directed substantially across the undulator gap.

14. The method of claim 13, wherein the second magnetic field orientation is directed substantially along the undulator gap.

15. The method of claim 1, wherein the undulator region further comprises a bunching undulator arranged upstream of the multi-polarization undulator, the method further comprising, at the bunching undulator:
receiving the first and second portions of the input electron beam;
generating microbunching in the first and second portions;
providing the first portion to the first polarization region; and
providing the second portion to the second polarization region.

16. A light source system comprising:
an electron splitter defining a first splitter output and a second splitter output, the electron splitter comprising a dynamic electromagnetic field (EMF) generator configured to accept an input electron beam and redirect electrons of the input electron beam such that a first portion of the input electron beam is output at the first splitter output and a second portion of the input electron beam is output at the second splitter output; and
a multi-polarization undulator comprising a first polarization region and a second polarization region, the multi-polarization undulator defining a single undulator gap that spans the first and second polarization region, wherein:
the first polarization region defines a first magnetic field pattern directed along a first direction within the undulator gap, wherein the first polarization region is configured to accept the first portion of the input electron beam such that the first portion traverses the undulator gap within the first polarization region, thereby generating a first light beam via free-electron lasing, the first light beam having a first optical polarization, the first light beam comprising at least one of EUV light or X-ray light; and
the second polarization region defines a second magnetic field pattern directed along a second direction within the undulator gap, the second direction substantially different than the first direction, wherein the second polarization region is configured to accept the second portion of the input electron beam such that the second portion traverses the undulator gap within the second polarization region, thereby generating a second light beam via free-electron lasing, the second light beam having a second optical polarization substantially different from the first light beam, the second light beam comprising at least one of EUV light or X-ray light.

17. The system of claim 16, further comprising:
a first redirector comprising a first dipole magnet configured to accept the first portion of the input electron beam downstream of the first polarization region and to redirect the first portion of the input electron beam; and
a second redirector comprising a second dipole magnet configured to accept the second portion of the input electron beam downstream of the second polarization region and to redirect the second portion of the input electron beam.

18. The system of claim 17, wherein:
the first redirector is configured to accept the first portion from the first polarization region; and
the second redirector is configured to accept the second portion from the second polarization region.

19. The system of claim 17, further comprising a second dynamic EMF generator configured to:
receive the first portion downstream of the first redirector;
receive the second portion downstream of the second redirector, wherein the first portion and the second portion are substantially non-collinear; and
redirect at least one of the first portion or the second portion such that the first portion and the second portion are substantially collinear, thereby generating a recombined electron beam.

20. The system of claim 16, wherein:
the first direction is substantially orthogonal to the second direction;

the first and second light beams are linearly polarized; and
the first optical polarization is substantially orthogonal to the second optical polarization.

21. The system of claim 16, further comprising a bunching undulator arranged between the electron splitter and the multi-polarization undulator, wherein the bunching undulator is configured to:
  receive the first and second portions of the input electron beam;
  generate microbunching in the first and second portions;
  provide the first portion to the first polarization region; and
  provide the second portion to the polarization region.

22. The system of claim 16, wherein the first direction is directed substantially across the undulator gap.

23. The system of claim 22, wherein the second direction is directed substantially along the undulator gap.

\* \* \* \* \*